(12) United States Patent
Winternitz et al.

(10) Patent No.: US 7,548,199 B2
(45) Date of Patent: Jun. 16, 2009

(54) RADIATION-HARDENED FAST ACQUISITION/WEAK SIGNAL TRACKING SYSTEM AND METHOD

(75) Inventors: Luke Winternitz, Greenbelt, MD (US); Gregory J. Boegner, White Hall, MD (US); Steve Sirotzky, Arlington, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 302 days.

(21) Appl. No.: 11/239,458

(22) Filed: Sep. 20, 2005

(65) Prior Publication Data

US 2006/0082496 A1    Apr. 20, 2006

Related U.S. Application Data

(60) Provisional application No. 60/612,396, filed on Sep. 20, 2004.

(51) Int. Cl.
*G01S 5/14* (2006.01)
(52) U.S. Cl. .................................. 342/357.15
(58) Field of Classification Search ............ 342/357.06, 342/357.12, 357.15
See application file for complete search history.

(56) References Cited

U.S. PATENT DOCUMENTS

| | | | | |
|---|---|---|---|---|
| 5,404,007 A | * | 4/1995 | Hotaling | ...................... 250/216 |
| 5,459,473 A | * | 10/1995 | Dempster et al. | ...... 342/357.12 |
| 5,594,453 A | | 1/1997 | Rodal et al. | |
| 6,014,080 A | * | 1/2000 | Layson, Jr. | ............. 342/357.07 |
| 6,211,822 B1 | | 4/2001 | Dougherty et al. | |
| 6,261,508 B1 | * | 7/2001 | Featherby et al. | ........... 264/408 |
| 6,278,404 B1 | | 8/2001 | Niles | |
| 6,289,041 B1 | | 9/2001 | Krasner | |
| 6,366,599 B1 | | 4/2002 | Carlson et al. | |
| 6,466,958 B1 | * | 10/2002 | Van Wechel et al. | ........ 708/422 |
| 6,735,243 B1 | | 5/2004 | Akopian | |
| 6,888,879 B1 | | 5/2005 | Lennen | |

(Continued)

OTHER PUBLICATIONS

J. Srinivasan et al., microGPS: On-Orbit Demonstration of a New Approach to GPS for Space Applications, Proceedings of the ION GPS '98, p. 1537-1545, Sep. 1998.*

(Continued)

*Primary Examiner*—Thomas H Tarcza
*Assistant Examiner*—Fred H Mull
(74) *Attorney, Agent, or Firm*—Matthew Johnston

(57) ABSTRACT

A global positioning system (GPS) receiver and method of acquiring and tracking GPS signals comprises an antenna adapted to receive GPS signals; an analog radio frequency device operatively connected to the antenna and adapted to convert the GPS signals from an analog format to a digital format; a plurality of GPS signal tracking correlators operatively connected to the analog RF device; a GPS signal acquisition component operatively connected to the analog RF device and the plurality of GPS signal tracking correlators, wherein the GPS signal acquisition component is adapted to calculate a maximum vector on a databit correlation grid; and a microprocessor operatively connected to the plurality of GPS signal tracking correlators and the GPS signal acquisition component, wherein the microprocessor is adapted to compare the maximum vector with a predetermined correlation threshold to allow the GPS signal to be fully acquired and tracked.

26 Claims, 10 Drawing Sheets

U.S. PATENT DOCUMENTS

| | | | |
|---|---|---|---|
| 7,069,019 B2* | 6/2006 | Sahai et al. | 342/357.15 |
| 2002/0067307 A1* | 6/2002 | Lin et al. | 342/357.12 |
| 2002/0072853 A1 | 6/2002 | Sullivan | |
| 2002/0196180 A1* | 12/2002 | Chang | 342/357.06 |
| 2004/0143392 A1 | 7/2004 | Kilfeather et al. | |
| 2004/0220734 A1 | 11/2004 | Gronemeyer | |
| 2005/0010362 A1* | 1/2005 | Dong-Sik | 342/358 |
| 2006/0055596 A1* | 3/2006 | Bryant et al. | 342/357.06 |

OTHER PUBLICATIONS

Eleanor Ketchum et al., "Modular GPS Review "PiVoT" Peer Review", Nov. 25, 1997, pp. 1-86, Greenbelt, MD, USA.

Mark L. Psiaki, "Block Acquisition of Weak GPS Signals in a Software Receiver", ION GPS 2001, Sep. 11-14, 2001, pp. 2838-2850, Salt Lake City, UT, USA.

Luke Winternitz, "Overview of GPS Signal Processing, Weak Signal Issues, and the PiVoT-2.0 GPS Receiver", Jul. 16, 2003, pp. 1-33, Greenbelt, MD, USA.

Luke Winternitz, "Hardware Accelerator FPGA Design Document", DrEvil FPGA, PiVoT2, Revision 0.3, Jul. 16, 2003, pp. 1-20, Greenbelt, MD, USA.

Luke Winternitz, "Tracking FPGA Design Document", Powers FPGA, PiVoT2, Revision 0.1, Jul. 16, 2003, pp. 1-16, Greenbelt, MD, USA.

* cited by examiner

RADIATION-HARDENED FAST ACQUISITION/WEAK SIGNAL TRACKING SYSTEM AND METHOD

CROSS-REFERENCE TO RELATED APPLICATION

This application claims the benefit of U.S. Provisional Patent Application No. 60/612,396 filed on Sep. 20, 2004, which is herein incorporated by reference in its entirety.

GOVERNMENT INTEREST

The embodiments of the invention described herein were made by employees of the United States Government, and may be manufactured and used by or for the United States Government for governmental purposes without payment of any royalties thereon or therefor.

BACKGROUND

1. Field of the Invention

The embodiments of the invention generally relate to signal processing and, more particularly, to techniques for signal acquisition and tracking.

2. Background

Global positioning systems (GPS) have found wide application for precision spacecraft navigation and formation flying applications in Low Earth Orbits (LEO), but recent advances in GPS receiver designs and signal processing capabilities now make it feasible to consider using GPS to provide autonomous, onboard navigation capabilities for geostationary (GEO) or other high altitude space missions.

Conventional (GPS) receivers are generally not readily capable of operating effectively at altitudes above LEO. This is primarily due, in part, to the fact that the GPS signals available there are approximately 10-100 times weaker much more sparsely present than on Earth or at LEO. However, GPS receivers typically provide a very accurate and economical means of navigation and have become very popular for LEO missions and could be just as popular for High Earth Orbit (HEO-above LEO) missions if the technology were available.

Generally, GPS signal processing can be divided into two major tasks: signal acquisition (or detection) and then signal tracking (and demodulation). Signal acquisition is the process of finding a GPS signal within a two-dimensional unknown parameter space. Signal tracking is the process of continuously updating the estimates of these two and other signal parameters. Signal acquisition is generally a more difficult process than signal tracking, and it is the inadequacy of conventional GPS acquisition techniques that generally prevents the use of weak signals in GPS receivers.

The generally inadequate (for weak signals) conventional approach is to employ a serial search of the two-dimensional parameter space during acquisition. Typically, the same hardware that is used in signal tracking is reconfigured to affect the search. During a cold-start, which is a lack of any prior (a priori) information about visible GPS signals, acquisition by serial search can take upwards of 20 minutes for a very strong signal. To acquire weak signals, more data must be examined. Approximately 10 times the data record length is required for a 10 times weaker signal. Using serial search methods acquisition times grow quadratically, which results in a 20-minute search increasing to approximately 33 hours, which practically means that the signal cannot be acquired at all. Accordingly, there remains a need for a new, fully space-qualified weak signal GPS receiver targeted for high altitude applications.

SUMMARY

Disclosed herein is a global positioning system (GPS) receiver comprising a GPS signal acquisition component including a frequency domain correlation module, wherein said GPS signal acquisition component is adapted to acquire said GPS signal with an Effective Isotropic Received Power (EIRP) of at least about −180 dBW, and wherein said GPS receiver is adapted to operate in a space environment. The GPS receiver may further comprise a plurality of GPS signal tracking correlators adapted to track said GPS signals with an EIRP of at least about −175 dBW. The GPS signal tracking correlators may comprise a Field-Programmable Gate Array (FPGA). The GPS signal acquisition component also may comprise an FPGA. The GPS signal acquisition component may be adapted to acquire a GPS signal within about one minute for GPS signals with an EIRP greater than about −180 dBW. The GPS signal acquisition component may be adapted to acquire a GPS signal within about one second for GPS signals with an EIRP greater than about −160 dBW. The GPS signal acquisition component alternately may be adapted to acquire a GPS signal within about one minute for GPS signals with an EIRP greater than about −180 dBW, and to acquire a GPS signal within about one second for GPS signals with an EIRP greater than about −160 dBW. The GPS signal acquisition component may be adapted to perform a Fast Fourier Transform (FFT) correlation process on said GPS signals. The GPS signal acquisition component may be adapted to acquire a GPS signal without a priori data.

Also disclosed heroin is a GPS receiver comprising a GPS signal acquisition component including a frequency domain correlation module, wherein said GPS signal acquisition component is adapted to acquire a GPS signal within about one second for GPS signals with an EIRP greater than about −160 dBW, and wherein said GPS receiver is adapted to operate in a space environment. The GPS receiver may further comprise a plurality of GPS signal tracking correlators adapted to track said GPS signals with an EIRP of at least about −175 dBW. The GPS signal tracking correlators may also comprise an FPGA. The GPS signal acquisition component optionally may comprise an FPGA. Also, the GPS signal acquisition component may comprise a frequency domain correlation module. The GPS signal acquisition component may be adapted to acquire a GPS signal with an EIRP greater than about −180 dBW. The GPS signal acquisition component may be adapted to acquire a GPS signal within about one minute for GPS signals with an EIRP greater than about −180 dBW. The GPS signal acquisition component may be adapted to perform an FFT correlation process on said GPS signals. Alternately, the GPS signal acquisition component may be adapted to acquire a GPS signal without a priori data for GPS signals with an EIRP greater than about −180 dBW.

Also disclosed herein is a GPS receiver comprising a GPS signal acquisition component including a frequency domain correlation module, wherein said GPS signal acquisition component is adapted to acquire said GPS signals with an EIRP of at least about −180 dBW without a priori data, and wherein the acquired GPS signal is acquired substantially in real time. The GPS receiver may further comprise a plurality of GPS signal tracking correlators adapted to track said GPS signals with an EIRP of at least about −175 dBW. The GPS signal tracking correlators also may comprise an FPGA. The GPS signal acquisition component may comprise an FPGA.

The GPS signal acquisition component may be adapted to acquire a GPS signal within about one minute for GPS signals with an EIRP greater than about −180 dBW. The GPS signal acquisition component may be adapted to acquire a GPS signal within about one second for GPS signals with an EIRP greater than about −160 dBW. The GPS signal acquisition component may be adapted to acquire a GPS signal within about one minute for GPS signals with an EIRP greater than about −180 dBW and to acquire a GPS signal within about one second for GPS signals with an EIRP greater than about −160 dBW. The GPS signal acquisition component may be adapted to perform an FFT correlation process on said GPS signals. The GPS signal acquisition component may be adapted to acquire a GPS signal without a priori data.

Also disclosed herein is a method of acquiring and tracking GPS signals, comprising the steps of: receiving GPS signals; performing a frequency domain correlation process on said GPS signals; comparing the correlated GPS signals with a predetermined threshold; and acquiring a GPS signal if a correlated GPS signal exceeds the predetermined threshold. The step of performing a frequency domain correlation process may comprise performing an FFT correlation process for a plurality of frequency increments of the received GPS signals. The step of acquiring a GPS signal may comprise acquiring the GPS signal if a correlated GPS signal exceeds the predetermined threshold for any of the frequency increments. The method of acquiring and tracking GPS signals further may comprise receiving GPS signals for a plurality of time increments, and accumulating the correlated GPS signals over a plurality of time increments to permit the acquisition of GPS signals with substantially lower received EIRP. Each of the plurality of time increments preferably is about 1 ms. The method further may comprise acquiring said GPS signals at an EIRP of at least about −180 dBW. The method further may comprise tracking said GPS signals at an EIRP of at least about −175 dBW. The method further may comprise acquiring a GPS signal within about one minute for GPS signals with an EIRP greater than about −180 dBW. The method further may comprise acquiring a GPS signal within about one second for GPS signals with an EIRP greater than about −160 dBW The method further may comprise acquiring a GPS signal with an EIRP greater than about −180 dBW within about one minute and acquiring a GPS signal with an EIRP greater than about −160 dBW within about one second. The method further may comprise acquiring a GPS signal with an EIRP greater than about −180 dBW without a priori data.

Also disclosed herein is a method of acquiring and tracking GPS signals, comprising the steps: receiving GPS signals for a plurality of time increments; performing a frequency domain correlation process on said GPS signals for each of the plurality of time increments; comparing the correlated GPS signals with a predetermined threshold; and acquiring a GPS signal if a correlated GPS signal exceeds the predetermined threshold for any of the plurality of time increments. Each of the plurality of time increments preferably is about 1 ms. The step of performing a frequency domain correlation process may include performing an FFT correlation process for a plurality of frequency increments of the received GPS signals for each of the plurality of time increments. The step of acquiring The GPS signal may include acquiring a GPS signal if a correlated GPS signal exceeds the predetermined threshold for any of the frequency increments for any of the time increments. The method further may comprise acquiring a GPS signal with an EIRP of at least about −180 dBW. The method further may comprise tracking a GPS signal with an EIRP of at least about −175 dBW. The method further may comprise acquiring a GPS signal with an EIRP greater than about −180 dBW within about one minute. The method further may comprise acquiring a GPS signal with an EIRP greater than about −160 dBW within about one second. The method further may comprise acquiring a GPS signal within about one minute for GPS signals with an EIRP greater than about −180 dBW and acquiring a GPS signal within about one second for GPS signals with an EIRP greater than about −160 dBW. The method further may comprises acquiring a GPS signal with an EIRP greater than about −180 dBW without a priori data.

Also disclosed herein is a computer program embodied in a computer readable medium for acquiring and tracking GPS signals, which comprises a receiver module for receiving GPS signals, a correlation module for performing a frequency domain correlation process on said GPS signals, a comparison module for comparing the correlated GPS signals with a predetermined threshold, and an acquisition module for acquiring a GPS signal if a correlated GPS signal exceeds the predetermined threshold to allow said GPS signal to be acquired and tracked. The correlation module may be adapted to perform the frequency domain correlation process by controlling a hardware acquisition component. The hardware acquisition component may comprise an FPGA. The computer readable medium may be radiation hardened. The receiver module may be adapted to receive GPS signals for one or more time increments. The frequency domain correlation process may comprise an FFT correlation process for a plurality of frequency increments of the received GPS signals for each of the one or more time increments. The acquisition module may be adapted to acquire a GPS signal if the correlated GPS signal exceeds the predetermined threshold for any of the frequency increments for any of the one or more time increments. The acquisition module may be adapted to acquire GPS signals with an EIRP of at least about −180 dBW. The computer program further may comprises a tracking module for tracking GPS signals with an EIRP of at least about −175 dBW. The acquisition module may be capable of acquiring a GPS signal with an EIRP greater than about −180 dBW within about one minute. The acquisition module may be capable of acquiring a GPS signal with an EIRP greater than about −160 dBW within about one second. The receiver module may receive GPS signals via a hardware receiver.

The present invention overcomes the problems and disadvantages associated with conventional methods and systems, and provides improved systems and methods for fast signal acquisition and weak signal tracking.

Other embodiments and advantages of the invention are set forth in part in the description that follows, and in part, will be obvious from this description, or may be learned from the practice of the invention.

BRIEF DESCRIPTION OF THE DRAWINGS

The embodiments of the invention will be better understood from the following detailed description with reference to the drawings, in which.

DETAILED DESCRIPTION

Figure 1:
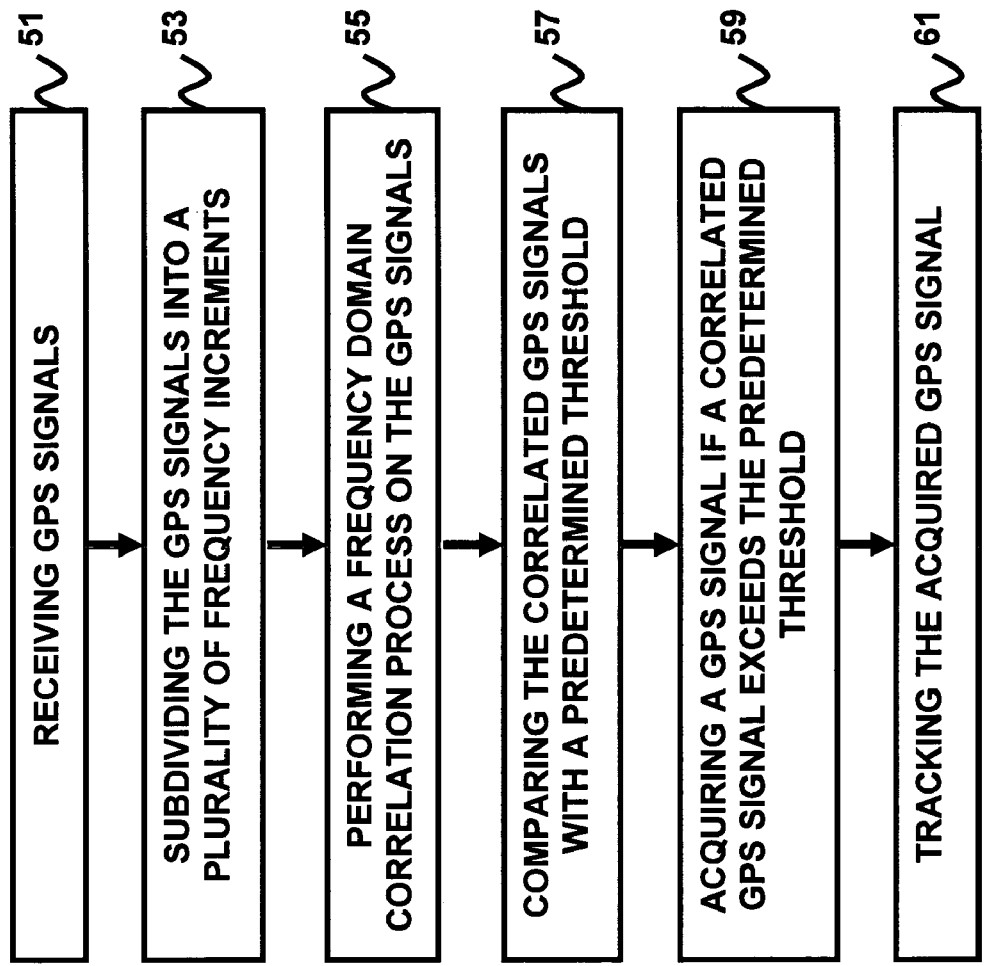
FIG. 1 is a flow diagram illustrating a preferred method according to an embodiment of the invention.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

As mentioned, there remains a need for a new, fully space-qualified weak signal GPS receiver targeted for high altitude applications. The embodiments of the invention achieve this by providing a space-borne GPS receiver that can operate effectively in the full range of Earth orbiting missions from LEO to GEO and beyond. Specifically, the embodiments of the invention provide a fully space flight qualified GPS receiver optimized for fast signal acquisition and weak signal tracking. The fast acquisition capabilities provide exceptional time to fix performance with no a priori receiver state or GPS almanac information, even in the presence of high Doppler shifts present in LEO (or near perigee in highly eccentric orbits). The fast acquisition capability also makes it feasible to implement extended correlation intervals and therefore significantly reduce the acquisition threshold of the embodiments of the invention. This greatly improves GPS observability when the receiver is above the GPS constellation (and satellites must be tracked from the opposite side of the Earth) by providing at least about 15 dB of increased acquisition sensitivity. One of skill in the art will recognize that the present invention, while particularly advantageous for space-based applications, from LEO to GEO and beyond, is not limited to the particular embodiments enclosed herein and can also be applied to other applications known to those of skill in the art where weak signal acquisition and tracking or fast signal acquisition are desireable. Some exemplary embodiments of the present invention are disclosed in the paper Luke Winternitz, et al, "Navigator GPS Receiver for Fast Acquisition and Weak Signal Tracking Space Applications," Proceedings of the Institute of Navigation GNSS 2004 Conference, Long Beach, Calif. September 2004, which is herein incorporated by reference in its entirety.

Referring now to the drawings, and more particularly to FIGS. 1 through 10, where similar reference characters denote corresponding features consistently throughout the figures, there are shown preferred embodiments of the invention.

FIG. 1 is a flow diagram illustrating a method of acquiring and tracking GPS signals according to an embodiment of the invention, wherein the method comprises receiving (51) GPS signals; subdividing (53) the GPS signals into a plurality of frequency increments; performing (55) a frequency domain correlation process on a plurality of the frequency increments of said GPS signals; comparing (57) the correlated GPS signals with a predetermined threshold; and acquiring (59) a GPS signal if a correlated GPS signal exceeds the predetermined threshold for any of the frequency increments of a GPS signal. The method optionally further includes tracking (61) the acquired GPS signal The step of performing a frequency domain correlation process preferably comprises performing a Fast Fourier Transform (FFT) correlation process to correlate the GPS signals.

Furthermore, the method may further comprise acquiring GPS signals at an EIRP of at least about −180 dBW; and tracking the GPS signals at an EIRP of at least about −180 dBW. Moreover, the method may further comprise fast acquisition of a GPS signal within about one second for GPS signals with an EIRP greater than about −160 dBW. In yet another embodiment, the method comprises fast acquisition of weak GPS with an EIRP greater than about −180 dBW within about one minute. One of skill in the art will recognize that a GPS receiver capable of fast acquisition of both strong and weak signals falls within the scope of the present invention. In yet another embodiment, the method may further comprise acquiring a GPS signal with an EIRP greater than about −180 dBW. without a priori data. One of skill in the art will recognize that the present invention permits acquisition of GPS signals more quickly for signals with higher received EIRP with no prior knowledge of the GPS signal.

Additionally, the method may further comprise acquiring a GPS signal within about one minute for GPS signals with an EIRP greater than about −180 dBW. The method optionally may further comprise combining the shifted GPS signals output by the FFT correlation process with a pre-computed, conjugated Discrete Fourier Transform (DFT) output. Additionally, the method preferably comprises performing an Inverse Fast Fourier Transform of the combined GPS signals and DFT output.

The embodiments of the invention can take the form including both hardware and software elements. The software embodiment includes but is not limited to firmware, resident software, microcode, etc. Furthermore, the embodiments of the invention can take the form of a computer program embodied in a computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. One of skill in the art will recognize that the foregoing types of computer readable media are merely exemplary and that other types of computer readable media are contemplated by the present invention.

A data processing system suitable for storing and/or executing program code preferably will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 2:
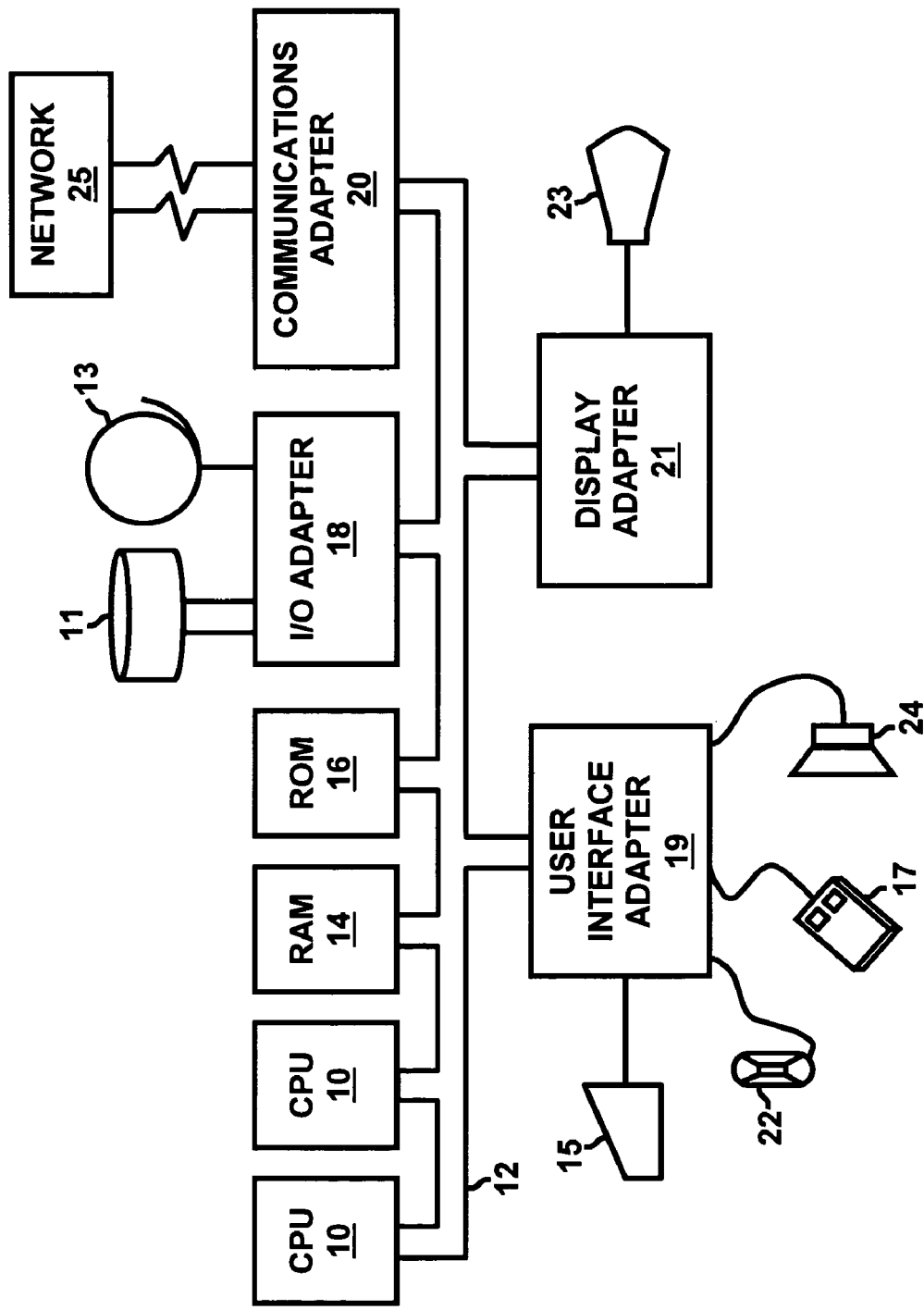
FIG. 2 is a computer architecture diagram according to an embodiment of the invention.

A representative hardware environment for practicing the embodiments of the invention is depicted in FIG. 2. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the computer program on the computer readable media and execute the computer program to implement the methodology of the embodiments of the invention. The system further may include a user interface adapter 19 that connects a keyboard 15, mouse 17, speaker 24, microphone 22, and/or other user interface devices such as a touch screen device (not shown) to the bus 12 to gather user input. Additionally, a communication adapter 20 may connect the bus 12 to a data processing network 25, and a display adapter 21 connects the bus 12 to a display device 23 which may be embodied as an output device such as a monitor, printer, or transmitter, for example.

Another embodiment of the invention provides aGPS receiver adapted for use in a space environment. In yet another embodiment, the GPS receiver may be adapted for operation in LEO orbit, a GEO orbit, or a variety of orbital conditions above or below GEO orbit. The GPS receiver may be fully space flight qualified using radiation-hard parts. Another embodiment preferably implements methodologies or algorithms in field-programmable gate arrays (FPGAs) to allow for easy modification, upgrading, and customization. Alternately, the method of the present invention may be implemented in one or more ASICs. One of skill in the art will recognize that a variety of hardware combinations fall within the scope of the present invention.

Another embodiment provides a GPS receiver which can acquire and track signals at an EIRP of −180 dBW. Another embodiment of the invention provides a GPS receiver capable of acquiring GPS signals within about one second for strong signals (with an EIRP greater than −160 dBW) and one minute for weak signals (with an EIRP greater than −180 dBW). One of skill in the art will recognize that the present invention permits acquisition of GPS signals more quickly for signals with higher received EIRP with or without a priori knowledge of the GPS signals.

The embodiments of the present invention provide performance improvements over the conventional receivers: (1) signals can be reliably acquired and tracked down to a received EIRP of about −180 dBW, which is at least a 15 dB improvement in sensitivity; and (2) Fast Fourier Transform (FFT) based acquisition algorithms provide extremely short acquisition times even for the weakest signals.

In order to make use of a GPS signal coming from a particular satellite, a GPS receiver first acquires and then tracks the signal. Again, the acquisition process is a much more computationally demanding task than the tracking process, requiring a search across a three-dimensional space of unknown time delay, Doppler shift, and satellite number. It is also a limiting factor for sensitivity for the common GPS receiver architecture. The acquisition methodologies implemented in the embodiments of the invention may be adapted from the weak GPS signal acquisition technique provided by Psiaki, M. L., "Block Acquisition of Weak GPS Signals in a Software Receiver," ION GPS 2001, 11-14 Sep. 2001, Salt Lake City, Utah, the complete disclosure of which, is herein incorporated by reference in its entirety. Psiaki presents a detection statistic and hypothesis testing scheme that enables the acquisition of very weak GPS signals with no a priori knowledge; in particular, no knowledge of the GPS data message bits. An embodiment of the present invention employs the methodologies taught in Psiaki using specialized hardware implemented in radiation-hardened FPGAs. In another embodiment, the acquisition process is capable of running substantially in real-time. For the purposes of this embodiment, substantially in real time means that the signal parameters of the acquired signal are valid for tracking purposes when acquired. In another embodiment, the GPS receiver is capable of achieving the desired sensitivity with acquisition times of only a few seconds.

The received, down converted and sampled GPS signal can be preferably modeled as:

$$y_k = s_k + n_k \quad k = 1, 2, \ldots \quad (1)$$

$$s_k = Ad\left(\frac{kT_s - \tau}{1+\eta}\right)c\left(\frac{kT_s - \tau}{1+\eta}\right)e^{j\omega kT_s} = Ad_k c_k e^{j\omega kT_s}$$

$$A = |A|e^{j\theta} = \sigma\sqrt{\frac{c}{N_0}T_s e^{j\theta}}, n_k \sim CN(0, \sigma^2)$$

Computationally, the received signal is $y_k$, comprising the sum of the GPS signal, $s_k$, and complex white Gaussian noise, $n_k$ (real and imaginary part of $n_k$ are $N(0,\sigma^2/2)$ and independent). Here, d(.) is the 50 bps GPS data message and c(.) is the 1.023 Mcps, 1 ms (1023 chip) periodic Pseudo Random Noise (PRN) spreading code, both taking values in $\{-1,+1\}$. Moreover, A comprises the complex GPS signal amplitude/phase, which is related to the received $C/N_0$ as shown with $T_s$, which comprises the sampling period in seconds. Moreover, $\omega$ connotes the Doppler shift in rad/s and $\eta = \omega/1.57542 \times 10^9$ is the unitless Doppler compression factor on the PRN code. Additionally, $\tau$ represents the time delay in the seconds module and is approximately 0.001 sec. Furthermore, $c_k$ and $d_k$ are the appropriately compressed and delayed code and data samples ($c_k(\tau)$ is denoted when it is desired to make dependence on $\tau$ explicit). The noise can be modeled as white because it is assumed that the signal is bandpass filtered to capture only the mainlobe and then sampled at the Nyquist rate for the resulting bandwidth.

For simplicity, it preferably is first assumed that there is only one known satellite signal potentially present and the data modulation d(.) is ignored. Then, GPS signal acquisition comprises determining whether this signal is present and, if so, at which point, ($\omega,\tau$). Given a finite set of samples, $y=(y_0, y_1, \ldots, y_{N-1})$ (s, n defined analogously), it is desired to test between the following hypotheses, and if $H_1$ is accepted, ($\omega,\tau$) is preferably estimated as:

$$H_0: y=n \Leftrightarrow |A|=0$$

$$H_1: y=s+n \Leftrightarrow |A|>0 \qquad (2)$$

The signal, s, may depend on a number of unknown parameters (A,$\omega,\tau$) which lie in some known space. The true values of these parameters are denoted as: (A.),$\omega.,\tau.$). Because of these unknowns, no clear optimal test generally exists under any common criteria. One approach is to use a Generalized Likelihood Ratio Test (GLRT). This procedure will usually produce the optimal test if it exists and otherwise generally gives effective sub-optimal testing procedures. The GLRT prescribes the following test:

$$GLR = \frac{\sup_{(A,\omega,\tau)} f_1(y; A, \omega, \tau)}{f_0(y)} > y \qquad (3)$$

Here, $f_i(.)$ denotes the joint probability density of the data under hypothesis $H_i$. That is, the ratio of the corresponding joint probability densities of the data under each hypothesis is computed, with the observed data substituted in (the likelihoods). Then, $H_1$ is decided if this ratio exceeds some threshold, which is preferably chosen to fix or bound the false alarm probability, $P_{FAs}$, using the Neyman-Pearson (NP) criterion. Unknown parameters preferably are replaced by their maximum likelihood (ML) estimates under $H_1$. The ML estimate of A may easily be determined (as a function of $\omega$ and $\tau$) to be:

$$A_{ML}(\omega, \tau) = \frac{1}{N} \sum_{k=0}^{N-1} y_k c_k e^{-j\omega k T_s} \qquad (4)$$

$$|A|_{ML} = |A_{ML}|, \theta_{ML} = \angle A_{ML}$$

The maximization of Equation (3) over ($\omega,\tau$) may be performed by a grid search over the range of allowable values: ($\omega,\tau$) in [$\omega_{min}, \omega_{max}$]×[0,0.001]. It can be shown by substituting in the corresponding multivariate Gaussian densities, that Equation (3) reduces to the familiar test on the correlation statistic (scaling term included to normalize the noise):

$$\max_{(\omega,\tau)} |Z_{(\omega,\tau)}(y)| > \tilde{y} \qquad (5)$$

$$Z_{(\omega,\tau)}(y) = \sqrt{\frac{2}{N\sigma^2}} \sum_{k=0}^{N-1} y_k c_k e^{-j\omega T_s}$$

That is, one looks for the maximum magnitude-squared, over ($\omega,\tau$), of the correlation between the input and a unit amplitude, zero-phase replica of the signal and compares it against a threshold. This is equivalent to comparing the full ML estimate of the signal amplitude against a threshold, which is intuitively satisfying.

The test described above preferably utilizes the calculation of correlation at each ($\omega,\tau$) using the same set of input samples. This is referred to as the parallel search. In contrast, most conventional GPS receivers typically employ a serial search. The local signal generator serially steps through the ($\omega,\tau$) grid and computes a correlation with the input samples, as the data streams in. When a threshold is crossed, a detection is declared at that particular ($\omega,\tau$). In the serial search, new data is used at each grid point. This amounts to performing an independent binary test at each grid point with ($\omega,\tau$) known (thus no need to estimate them). In fact, if phase is treated as random and uniformly distributed in (0, 2$\pi$), this is a preferred (Uniformly Most Powerful for |A|>0) test under the NP and Bayes criteria. In this case, there is no maximization and the statistics of Z, from Equation (5), completely, specify the performance of the test. The false alarm probability preferably is set for the individual tests and thus is actually the false alarm rate. This rate can be traded off against the detection probability. In the serial search, false alarms slow the acquisition process, but are not devastating because the tracking eventually fails when initialized with a false signal. After the failure, acquisition can continue where it is left off.

In the parallel search, a single block of data is used to maximize |Z| over the test grid. Although the same computations are performed as in the serial case (only on a fixed block of data rather than new blocks), the problem is statistically very different. In this case, the test statistic is max|Z| whose exact distribution is very difficult to obtain since there is a dependence between the correlations across the search grid. The "($\omega,\tau$) known" statistics, which fully characterize the serial test, can be used in the parallel case to obtain bounds on the false alarm probability as well as the approximate performance.

One method for controlling $P_{FA}$, in the parallel search, is via the union bound. Here, one preferably divides the desired overall false alarm probability by the number of grid points and uses that to set the threshold assuming ($\omega,\tau$) known. In another embodiment, one can assume:

$$Pr(\max_{(\omega,\tau)} |Z(\omega, \tau)| > y) \approx Pr(\max_{(\omega',\tau')} |Z(\omega', \tau')| > y) \qquad (6)$$

where the ($\omega',\tau'$) are the mutually independent points on the grid. There are approximately $K_{indep}$=1023*DopplerRange*NT, of these independent points. With independence, one can solve for the exact threshold for a given $P_{FA}$. Using $P_{FA}/K_{indep}$ in the ($\omega,\tau$) known test provides a very good approximation to the desired threshold.

False alarms are generally less tolerable in the parallel case. There is a range of threshold values where there is a very high probability that at the true signal point, $Z(\omega_0,\tau_0)$ will exceed the threshold, and so the signal should eventually be detected by the serial search. However, there is also a relatively large false alarm rate and a large probability that $Z(\omega_0, \tau_0)$ is not the largest correlation over the grid. One way to look at it is that the correct decision, $H_1$, is made, but the estimation of ($\omega,\tau$) is bad. This is referred to as a "Type III" error, as opposed to false alarms under $H_0$ or "Type I" errors, and missed detections under $H_1$ or "Type II" errors. Another approach to this problem is as an M-ary test with $H_{(\omega,\tau)}$: "signal present at ($\omega,\tau$)", wherein similar results can be obtained.

One of the problems with a serial search is that the serial search process, where new data is used in each correlation, takes too long for weak signals. For example, using N corresponding to 1 ms typically allows for a best-case acquisition of signals of about 35 dB-Hz, which corresponds to an EIRP of approximately −165 dBW, (with many false alarms). In this case, the time to first fix performance (TTFF) could be on the order of about 30 min. If one desires a 10 times improvement in sensitivity, one could increase the N to 10 ms, but in addition one also has to increase the fineness of the grid in the frequency dimension by another factor of 10. This implies a new TIFF on the order of about 3,000 min. Accordingly, the search preferably is parallelized. In either case, a rather large number of correlations need to be quickly computed.

Figure 3:
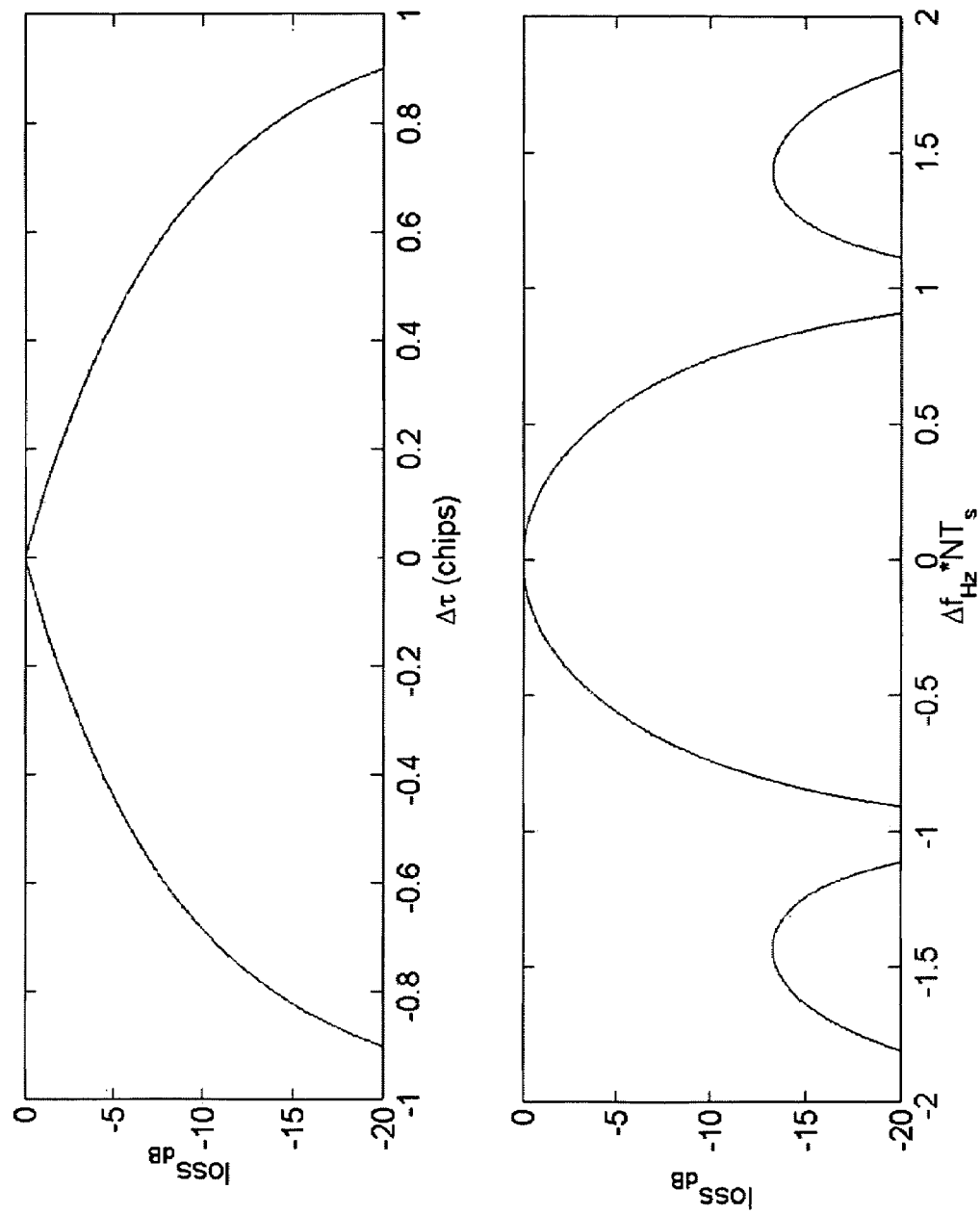
FIG. 3 illustrates graphical representations of ambiguity function cross-sections according to an embodiment of the invention.

The following results from computing Equation (4):

$$Z_{(\omega,\tau)}(y) = \sqrt{\frac{2}{N\sigma^2}A\underbrace{\sum_{k=0}^{N-1}c_k(\tau_0)c_k(\tau)e^{-j(\omega-\omega_0)kT_s}}_{R(\Delta\tau,\Delta\omega)} + n_=} \quad (7)$$

$$= \sqrt{2\left(\frac{C}{N_0}\right)_{\mathit{eff}}NT_se^{j(\theta+\tilde{\theta})} + n_=}$$

$$\left(\frac{C}{N_0}\right)_{\mathit{eff}} = \frac{C}{N_0}|R(\Delta\tau,\Delta\omega)|^2 \quad n_= \sim CN(0,2)$$

where $(\Delta\omega, \Delta\tau)=(\omega-\omega_0, \tau-\tau_0)$ comprise the errors in estimating $(\omega,\tau)$, and $\theta$ (tilde) comprises the phase of $R(\Delta\omega,\Delta\tau)$. This $R(\Delta\omega,\Delta\tau)$ (which approximately depends only on $\Delta\tau$) is sometimes referred to as the ambiguity function, and it generally specifies the necessary fineness of the grid upon which the maximization of Equation (4) is performed. Uncertainty or error in the estimates of $\omega$ and $\tau$ result in a reduced mean of the correlation statistic and can be viewed as a decrease of the effective input $C/N_0$. The cross sections of $R(.,.)$, which are plotted in FIG. 3 are given by the following equations:

$$|R(\Delta\tau,0)|^2 \approx \left(1 - \frac{|\Delta\tau|}{T_{s\Delta\omega}}\right)^2, |R(0,\Delta\omega)|^2 = \left|\frac{\sin(\Delta\omega T_s N/2)}{N\sin(\Delta\omega T_s/2)}\right|^2 \quad (8)$$

It is desirable to keep $|\Delta\omega|<1/(4\ NT_s)$,\ restricting loss along a frequency axis to approximately 0.2 dB and to keep $|\Delta|<\frac{1}{4}$ chip, which restricts the loss to approximately 2.5 dB along the code-delay axis. In FIG. 3, $\Delta\omega=0$ in the upper graph and $\Delta\tau=0$ in the lower graph.

Assuming the $(\omega,\tau)$ are known or fixed, and the GPS data message is constant over the block of input samples of interest, then the statistics of Z are readily determined to be:

$$\lambda \equiv 2\left(\frac{C}{N_0}\right)_{\mathit{eff}}NT_s \quad (9)$$

$$Z_{(\omega,\tau)}(y) = \sqrt{\lambda e^{j\tilde{\theta}}} + n_z \sim CN(\sqrt{\lambda e^{j\tilde{\theta}}}, 2)$$

$$H_0 : |Z_{(\omega,\tau)}(y)|^2 \sim X_2^2(0)$$

$$H_1 : |Z_{(\omega,\tau)}(y)|^2 \sim X_2^2(\lambda)$$

Under $H_0$ the test statistic is a chi-squared random variable with two degrees of freedom and under $H_1$ the test statistic is a second degree non-central chi-squared with non-centrality parameter $\lambda$, which is a product of twice the effective $C/N_0$ and the integration time, $NT_s$.

Figure 4:
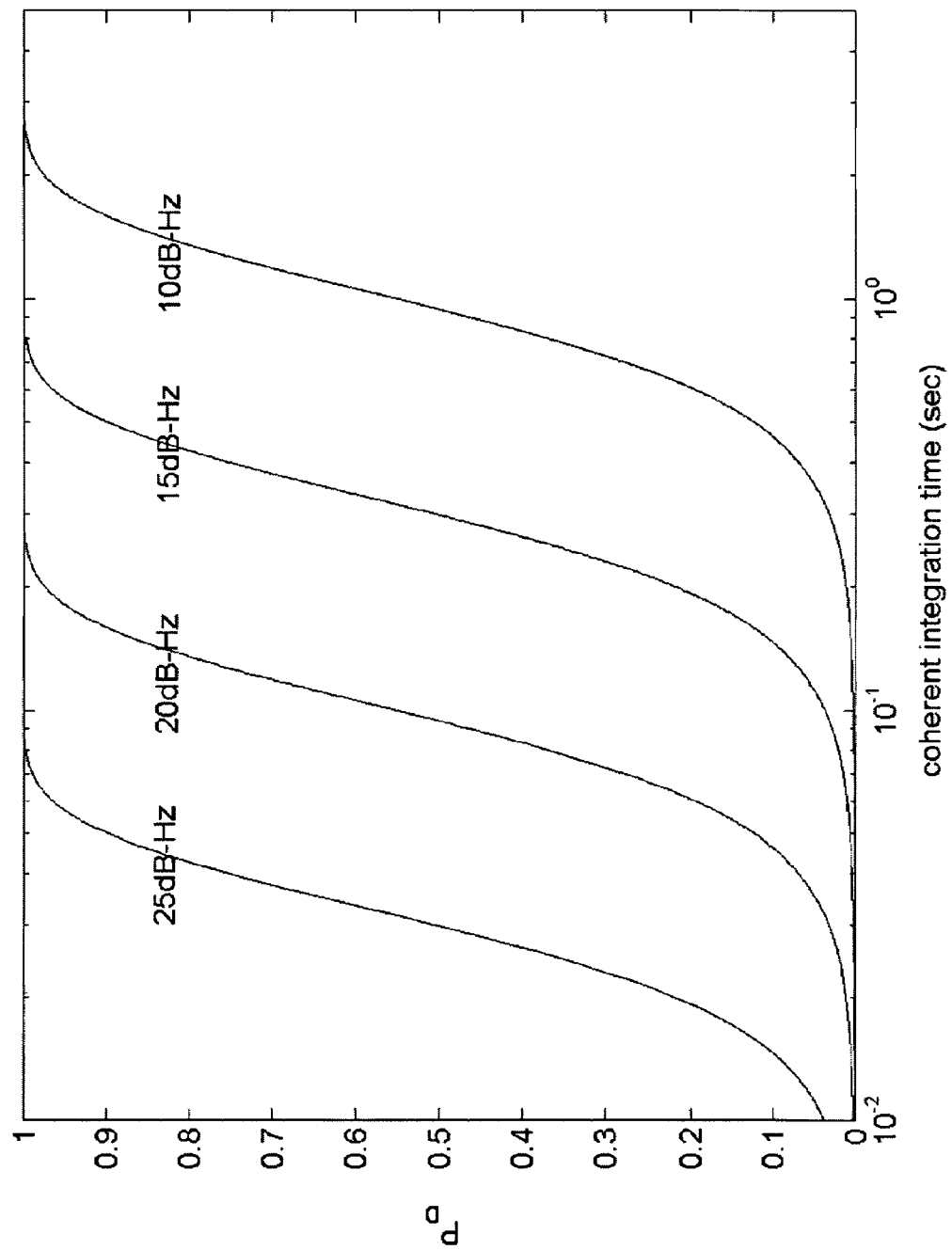
FIGS. 4 and 5 illustrate graphical representations of performance curves according to an embodiment of the invention.

These statistics fully characterize the serial search and can be used to bound the false alarm probability for the parallel search. They also provide the probability that the true signal will cross the threshold under $H_1$, but do not account for the "Type III" event that there is a larger correlation at another $(\omega,\tau)$ coordinate. When the overall false alarm probability is kept low, however, the "Type III" event is rare and the curves shown in FIG. 4 provide an approximate performance. Specifically, performance curves for the parallel search with $P_{FA}$ divided down by 1023 (appropriate for search across all code delays and a 1 kHz Doppler range) are shown in FIG. 4, with $P_D$ vs. coherent integration time $(\omega,\tau)$ known and $P_{FA}=0.05/1023$. Here, a factor of 10 increase in integration time generally results in a 10 dB increase in sensitivity.

Unfortunately, the 20 ms GPS databit limits how long the coherent integration can run (other effects such as signal and clock dynamics limit this time as well but on a longer scale than 20 ms). Correlating over a databit transition may result in unpredictable cancellation of correlation power. Even using 20 ms generally requires knowledge of the bit start times. The bit start time could be added to the problem as an unknown parameter and one could further maximize Equation (3) over the additional dimension. Generally, a single 20 ms coherent correlation generally will not reliably detect the desired 25 dB-Hz signal (corresponding to an EIRP of approximately −175 dBW), accordingly, what is needed is a way to extend the correlations beyond the databits.

One embodiment capable of solving the problem is the "half-bits" method, which collects consecutive 10 ms correlations. If one looks at this collection as two alternating sets, then, one is guaranteed to be free of transitions. A collection of M 10 ms (or any arbitrary L ms not necessarily equal to 10) coherent correlations that individually avoid databit transitions, $\{Z_{(\omega,\tau),ms}\ m=1,2\ldots L\}$, can be combined "non-coherently" by taking the magnitude squared and then summing. This removes the problematic databit.

$$Q_{(\omega,\tau)} = \sum_{m=0}^{M-1}|Z_{(\omega,\tau),m}|^2 \quad (10)$$

$$Q^* = \max_{(\omega,\tau)} Q_{(\omega,\tau)}$$

$Q^*$ is then used as the test statistic. This is the "$P_{lang}$" detection statistic described by Psiaki. This seems reasonable, and can also be arrived at as the Locally Most Powerful (LMP) test under certain assumptions. This combined L ms coherent and M block non-coherent integration is referred to as the "L/M integration".

Another reason to keep the coherent integration period short is because of the structure of the ambiguity junction along the frequency axis. Correlations preferably can be combined non-coherently for as long as desired without the need for increasing frequency resolution. For 10 ms coherent integration, a 25 Hz grid spacing will generally result in a worse case loss of only approximately 0.2 dB.

Again, for a given $(\omega,\tau)$ and assuming the databit transitions have been avoided, the statistics of Q may be determined to be:

$$H_0:Q_{(\omega,\tau)}(y)\sim X_{2M}^2(0) \quad (11)$$

$$H_1:Q_{(\omega,\tau)}(y)\sim X_{2M}^2(M\lambda)$$

Figure 5:
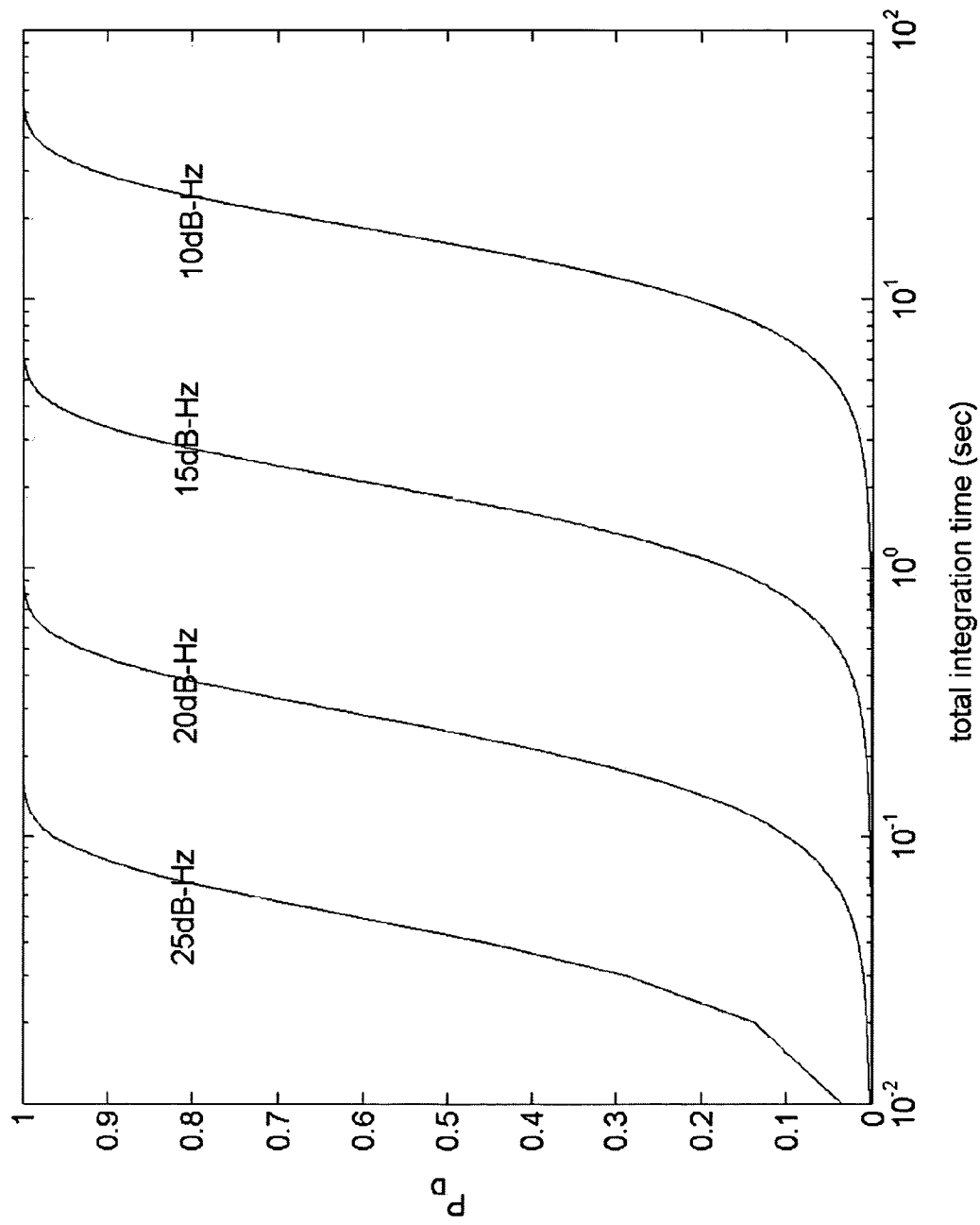

Performance curves for the parallel search with $P_{FA}$ divided down by 1023 are shown in FIG. 5, with $P_D$ vs. total integration time for 10M integrations with $(\omega,\tau)$ known and $P_{FA}=0.05/1023$. The gains from non-coherent integration come more slowly than from coherent integration. Sensitivity increases roughly with the square root of integration time. A 10 times longer integration results in only approximately a 5 dB increase in sensitivity. However, a 25 dB-Hz signal can be very reliably acquired (>0.9 probability) by summing the squared magnitudes of only 10 ms coherent correlations. This is only one tenth of a second of data. Furthermore, 20 dB-Hz and lower are reachable with not unreasonably long data records.

Figure 6:
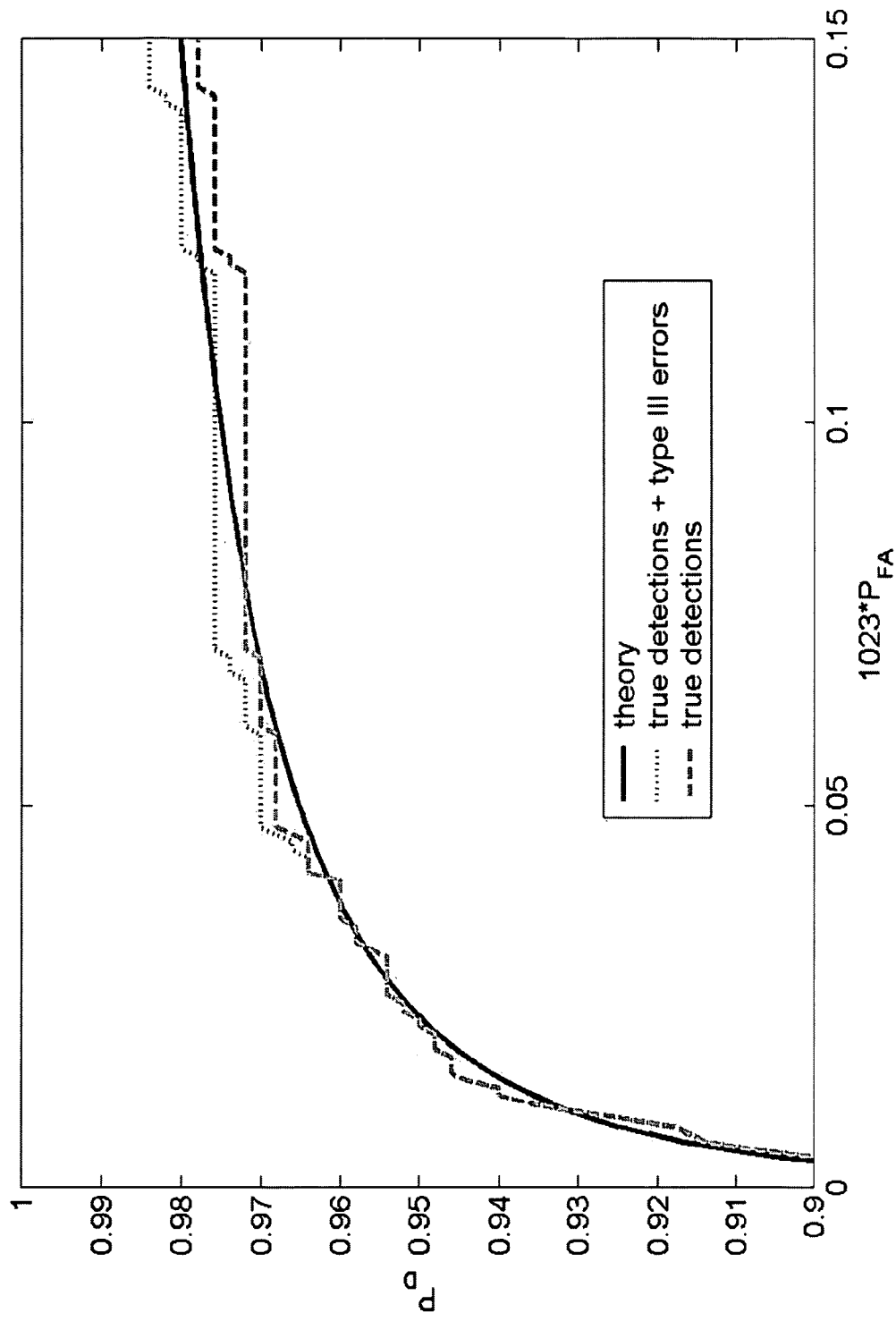
FIG. 6 illustrates graphical representations of receiver operating characteristic (ROC) curves according to an embodiment of the invention.

As a check on the reliability of these results, FIG. 6 shows the results of a small simulation study which examines the Receiver Operating Characteristic (ROC, $P_D$ vs. $P_{FA}$) for a 25 dB-Hz GPS signal with zero Doppler assumed. In FIG. 6 the ROC curves are shown for ROC for 10/10 integration, 25 dB-Hz signal, with $\omega=0$ known, $\tau$ unknown, $P_{FA}$ divided down by 1023. The observed curve in FIG. 6 shows good agreement with the theoretical result. The Type III error deviations are also clearly seen to be a real phenomenon but as mentioned, they are rare when the $P_{FA}$ is low and thus the threshold is set high.

One of the primary effects of interfering signals is that the cross-correlation peaks cause the number of false alarms to increase for a given threshold level. One solution is to increase the thresholds to control the $P_{FA}$ and correspondingly increase the integration intervals to recover $P_D$. This will work when the power difference is moderate, but may fail for disparities greater than about 20 dB, at which point the acquisition of the weak signal is difficult without somehow dealing with the interfering signal. One possible solution is through careful selection among the available antennas on the spacecraft or through the use of antenna phasing to help reject the unwanted strong signal jammer. Alternatively, one can try to acquire and track the strong signals first and then cancel them out of the input before attempting the weak signals. During tracking, precise estimates of $(\omega,\tau,\theta)$ are maintained and all that is additionally needed is the signal amplitude, $|A|$, whose ML estimate is given in Equation (4). It is possible to use this in online processing and may be incorporated in the embodiments of the invention.

In one embodiment, the receiver can quickly and reliably acquire and track signals down to received EIRP of approximately −180 dBW and lower by employing special hardware that computes the Q-statistic described above. In another embodiment, the receiver preferably operates autonomously. That is, it does not require external data aiding or any other a priori information such as a current estimate of time, a recent GPS almanac or a converged navigation filter estimate of the receiver dynamics, etc. If such a priori information is available, then the embodiments of the invention may be able to make use of it to reduce acquisition time, but it is not assumed to be available and is not required.

In yet another embodiment, the GPS receiver of the present invention preferably operates substantially in real-time. Data is double buffered up front in 1 ms blocks and processed as it comes in. One could use large up front storage to buffer the entire record of sampled data needed for acquisition. Processing can then occur with relaxed elite constraints, only needing to be sufficiently fast such that the $(\omega,\tau)$ estimate will still be valid when processing finishes. In yet another embodiment, the receiver operates in a faster than real-time mode to catch up with the streaming input, or simply begins tracking on the most recent samples.

Yet another embodiment uses Discrete Fourier Transform (DFt) based computation of the 1 ms correlations. When the FFT methodology is used to compute these DFTs, large computational savings are achieved. Specifically, when an N-point DFT is computed, the savings are $O(N/\log_2(N))$. This method preferably calculates all code delay correlations in ½ chip increments using a single 1 ms block of data. This technique optionally may be used for Direct Sequence Spread Spectrum (DSSS) signal acquisition. Generally, the DFT of a signal $x=(x_0, x_1 \ldots x_{N-1})'$; preferably is given by:

$$X_k = \sum_{n=0}^{N-1} x_n e^{-j\frac{2\pi}{N}kn} = DFT[x]_k \tag{12}$$

The "circular-correlation property" gives the following identity (where $\circ$ connotes point by point multiplication of the vectors):

$$Z_n = \sum_{k=0}^{N-1} X_k c_{(k+n)modN} = IDFT[X \circ C^*]_n \tag{13}$$

To apply this to the current problem, a 1 ms block of the baseband downconverted input signal is used as the x and the DFT of the code sequence as C, which can be computed offline, and the following is computed ($\tau$ now represents an integer offset of the code between 0 and N-1):

$$Z_{(\omega,\tau)}(y) = \sum_{k=0}^{N-1} [y_k e^{-j\omega k T_s}]c_{c+\tau} \tag{14}$$
$$= \sum_{k=0}^{N-1} [y_k e^{-j\omega k T_s}]c_{(k+\tau)modN} = IDFT[X \circ C^*]_\tau$$

This gives the 1 ms correlation. The effect of Doppler shift on the code sequence is ignored for now and is further discussed below. To get a longer correlation, L consecutive 1 ms block correlations are added:

$$Z_{(\omega,\tau)}(y) = \sum_{k=0}^{LN-1} y_k c_{k+\tau} e^{-j\omega k T_s} \tag{15}$$
$$= \sum_{l=0}^{L-1} \sum_{k=Nl}^{(N+1)l-1} [y_k e^{-j\omega k T_s}]c_{(k+\tau)modN}$$
$$= \sum_{l=0}^{L-1} IDFT[X_l \circ C^*]_\tau$$

This calculation can be repeated and the squared magnitudes summed to get the desired Q-statistic. In one embodiment, the acquisition hardware implements this sequential process. In another embodiment, the sequential process is implemented in software.

With this method, the Q-statistic is calculated for the entire code dimension based on a single block of input data. Furthermore, if many FFTs can be performed in bits, then one can search across the Doppler dimension as well. To search the frequency dimension, this method preferably is repeated for each frequency on the search grid at whatever frequency granularity desired. In this way, the entire $(\omega,\tau)$ grid (at least over a range of Doppler frequencies) can be searched in parallel.

The embodiments of the invention may utilize different methods to reduce the number of DFT operations required. One method preferably uses the well-known frequency shifting property of the DFT. A reference (coarse) Doppler shift preferably is removed from a 1 ms block of the input signal and its DFT is computed. The DFT vectors of all multiples of 1 kHz offset from this reference are then obtained by shifting the reference DFT vector. This technique reduces the number of forward DFTs needed, but not the number of Inverse Discrete Fourier Transforms (IDFTs). Another method explains how to interpolate from a coarse grid of frequencies with spacing on the order of hundreds of Hz to the needed fine grid spacing of approximately a factor of 10 finer. This interpolation onto the fine grid is similar to the "Post-Correlation FFT" methods that are becoming popular for GPS acquisition. However, a 1 ms coherent dump time preferably is used, as opposed to the fractional ms dump conventionally used, and rather than using an FFT, which computes the Discrete Time Fourier Transform (DTFT) ordinates at the Fourier frequencies, $1/(LNT_s)$, the embodiments of the invention preferably compute a few DTFT values at the desired frequencies.

The first equality in Equation (14) holds when c(.) is exactly N-periodic. An appropriately Doppler compressed/expanded version of the code that would not be exactly N-periodic prerferably is correlated with the input. Exemplary methods to solve this problem include resampling the input in each Doppler bin to enforce exactly 1 PRN period in N samples. In this case the N-periodic c(.) is the correct replica. Alternately, one could implement a delay correction applied in the frequency domain prior to the IDFT.

A preferred approach is to initially ignore the issue and correct for the ill effects later. One embodiment preferably employs a re-mapping of the stored correlation grid. The effect of the code Doppler is that the apparent correlation peak drifts through the correlation grid in the delay dimension at a rate determined by the Doppler bin under test. It is sufficient to correct this issue only upon accumulation into memory approximately every 20 ms (via re-mapping back to the appropriate code bin).

$$\text{Drift} = \frac{f_{chip} f_{dopp}}{f_{L1}} \text{chips/sec} \quad (16)$$

Assuming an 8 kHz maximum Doppler magnitude, appropriate for GEO, this drift is limited by 0.1039 chips in 20 ms. This actually serves to average out the worst (and best) case loss caused by code misalignment for very long acquisitions. Using ½ chip search spacing, rather than 2.5 dB worst-case loss, an average loss of approximately 1.2 dB is achieved for long integrations affected by moderate Doppler shifts.

In yet another embodiment, the present invention offers an extremely fast strong signal mode. In this mode, the acquisition is based on a single 1 ms block of input samples. This 1 ms block optionally is buffered and then FFT based correlations preferably sweep across the entire Doppler space (Doppler removal) at the desired granularity. A frequency-shifting device preferably is used in this mode, but interpolation onto the fine grid is not needed. The maximum correlation value of this operation preferably can be determined without the need to store the entire grid. Thus, the need for a large amount of high bandwidth memory preferably is substantially eliminated in this mode.

Using the maximum over the correlation grid as the detection statistic will necessarily limit the sensitivity of this mode to received EIRP of about −160 dBW. The threshold preferably is set rather high to limit the "Type III" errors. Other conventional receivers may be able to acquire signals at about −165 dBW based on the same 1 ms correlation but they tend to do this at the cost of very high false alarm rates (i.e., approximately 0.17%).

Another embodiment of the present invention offers a weak signal mode. In this embodiment, 10 ms coherent integrations are combined (separated by a 10 ms delay) non-coherently by summing the squared magnitudes as in the definition of Q in Equation (10). This can be performed indefinitely, limited only by signal and clock dynamics. In practice M=10 will acquire the −175 dBW signal reliably and M=100 can achieve −180 dBW.

The weak signal mode utilizes two separate memories. The memory preferably stores the 10 individual 1 ms correlations for each coarse Doppler and the accumulation of the Q statistic. Preferably, two Q-statistics are collected, one for each set of alternating 10 ms blocks. However, only one preferably is computed at a time. The "off" 10 ms preferably is used for computation. The second set preferably is checked only if the first set fails to produce a detection. Since the coherent integration period is 10 ms, a 25 Hz Doppler spacing is preferably used, which restricts $C/N_0$ losses to approximately 0.2 dB. Due to the fine granularity, this mode uses both the frequency shifting properly of the DFT and interpolates onto a fine grid of frequencies to reduce the number of FFT operations needed.

The maximum Doppler range that can be searched at once is limited by the number of FFT operations that can be completed in 1 ms and the available bandwidth to the off chip memories. This is further described below. To cover the fill Doppler range, the frequencies are searched sequentially in this maximum Doppler block size. Arbitrary L/M modes are available as well, but 1/1 (strong) and 10/M (weak) are determined to be the most useful. For example, if data aiding is available then L>10 may be desirable.

In the weak signal mode, the $(\omega,\tau)$ estimate provided by the acquisition module may not be sufficiently accurate to initialize tracking, particularly in the $\omega$ dimension. Furthermore, determination of the location of the GPS databit transition is significant when tracking weak signals. When the acquisition terminates with a successful detection, the estimated $(\omega,\tau)$ is used to initialize a tracking correlator/channel. Open loop 1-PRN (~1 ms) period accumulations are collected for a specified amount of time; e.g. J-PRN periods, during which the following statistic preferably is calculated to determine an estimate of the bit transition time; i.e., to get bit lock (K=floor (J/20)):

$$l^* = \arg\max_{l \in (0,\dots,19)} \sum_{k=0}^{K-1} \left| \sum_{j=20k+l}^{20k+19+l} Z_j \right|^2 \quad (17)$$

This assumes that the initial frequency estimate is sufficiently good enough so residual frequency error does not cancel out the above 20 ms correlations. In another embodiment, $|\Delta\omega|$ is preferably verified to be less than 12.5 Hz before attempting to compute Equation (17).

To resolve frequency more finely, one can process the same type of $\{Z_k\}$ post-correlation sequence. When the replica phase is kept continuous over K consecutive L ms coherent integration blocks, the individual correlations can have the preferred form:

$$Z_k = b d_k e^{j\Delta\omega k(LNT_s)} + n_k \quad (18)$$

Here, $d_k$ is the GPS databit and b is essentially a complex constant independent, of k. This being so, if one were to square each $Z_k$ (to remove the databit), then one acquires a pure complex exponential plus (non-Gaussian) noise, for which the maximum of the periodogram is an often used estimator of frequency. One can use an FFT engine to compute the periodogram and maximize it to get an estimate of $2\Delta\omega$. Experimentally, this has been shown to work using L=1 ms, for signals even below 25 dB-Hz with J=2048, giving a resolution of <1 Hz. for $\Delta\omega$. For smaller J, one may zero-pad the Z-squared sequence. This assumes the frequency rate is sufficiently small such that the residual Doppler is roughly constant over J*L-ms. Depending on the application, the two calculations can be performed simultaneously, or first Equation (17) then Equation (18) is performed, or vice-versa.

Another embodiment employs standard frequency locked loop/phase lock loop/delay lock loop (FLL/PLL/DLL) tracking methods using 1 ms correlations for strong signals and with correlations extended to 20 ms for tracking weak signals. PLL tracking down to approximately 23 dB-Hz is achievable with 20 ms correlations and an oscillator. Phase tracking is known to be the weak link as compared with carrier frequency code tracking. The theoretical bit error probability at $C/N_0$=25 dB-Hz is approximately $10^{-4}$ for perfect coherent demodulation of binary phase shift keying (BPSK) signals, so data demodulation can be performed relatively well. Much below 25 dB-Hz, using traditional FLL/PLL/DLL tracking, reliable data demodulation becomes difficult and phase tracking begins to fail. Moreover, bit error probabilities can be improved by averaging many cycles of the repeating GPS data message.

Figure 7:
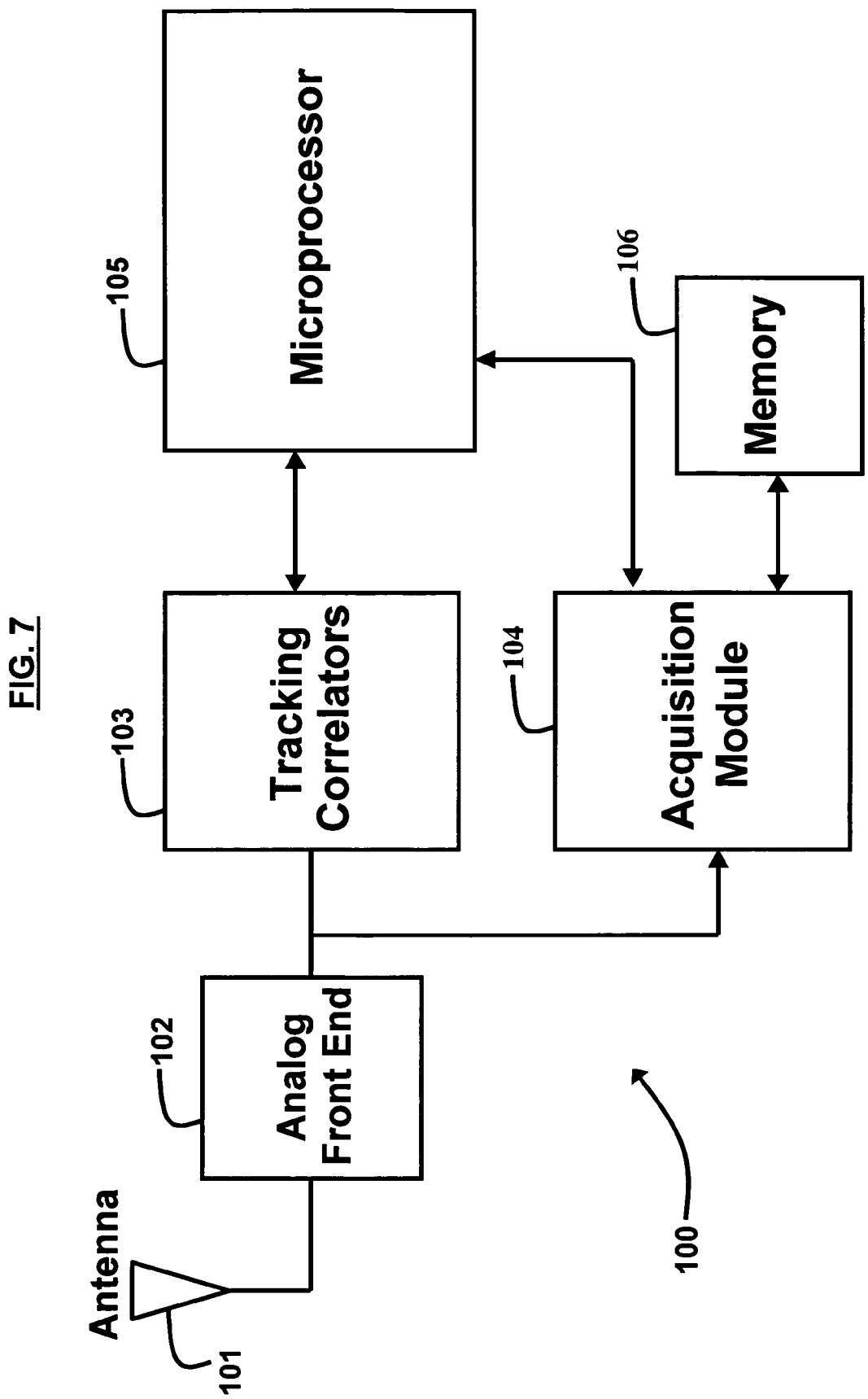
FIG. 7 illustrates a system block diagram according to an embodiment of the invention.

As illustrated in FIG. 7, the receiver 100 provided by one embodiment of the present invention comprises an antenna 101 operatively connected to an analog front end component 102, which is operatively connected to a bank of hardware tracking correlators 103 controlled by a general purpose microprocessor 105. In addition, the analog front-end component 102 also operatively connects to a specialized acquisition module 104 that rapidly calculates the long-term detection statistic, Q*, and is controlled by a memory device 106 and the microprocessor 105.

All of the GPS specific hardware shown in FIG. 7 preferably is implemented in Very High Speed Integrated Circuit (VHSIC) Hardware Description Language (VHDL) to target radiation-hardened FPGAs. Alternately, an Application Specific Integrated Circuit (ASIC) or other hardware implementation. In yet another embodiment some or all of the hardware components depicted in FIG. 7 may be implemented in software without departing from the scope of the present invention.

Simulated software models of the above methodologies were used to evaluate the performance and implement modifications. Other models were designed to emulate the hardware and were used as a guide for the hardware design. Specifically, sampling rate, analog-to-digital converter (ADC) bit depth, and all other data path bit-depths, most importantly for the FFT, were determined. For hardware implementation, these rates and depths are preferably held to be as small as possible without sacrificing too much performance.

Experimentally, the sampling rate was chosen to be approximately 2.048 Msps. This is just over the Nyquist rate for capturing the main lobe of the C/A code (using complex samples) and gives 2048 samples in the 1 ms nominal code period. This allows for the use of the efficient radix-2 FFT algorithm. This embodiment yields a ½ chip resolution for the acquisition that amounts to a 2.5 dB worst-case loss of the effective $C/N_0$. This loss may be significant and so 4.096 Msps is also considered. However, doubling the sampling rate also tends to double the memory size and bandwidth requirement, which may be deemed an unacceptable cost.

Figure 8:
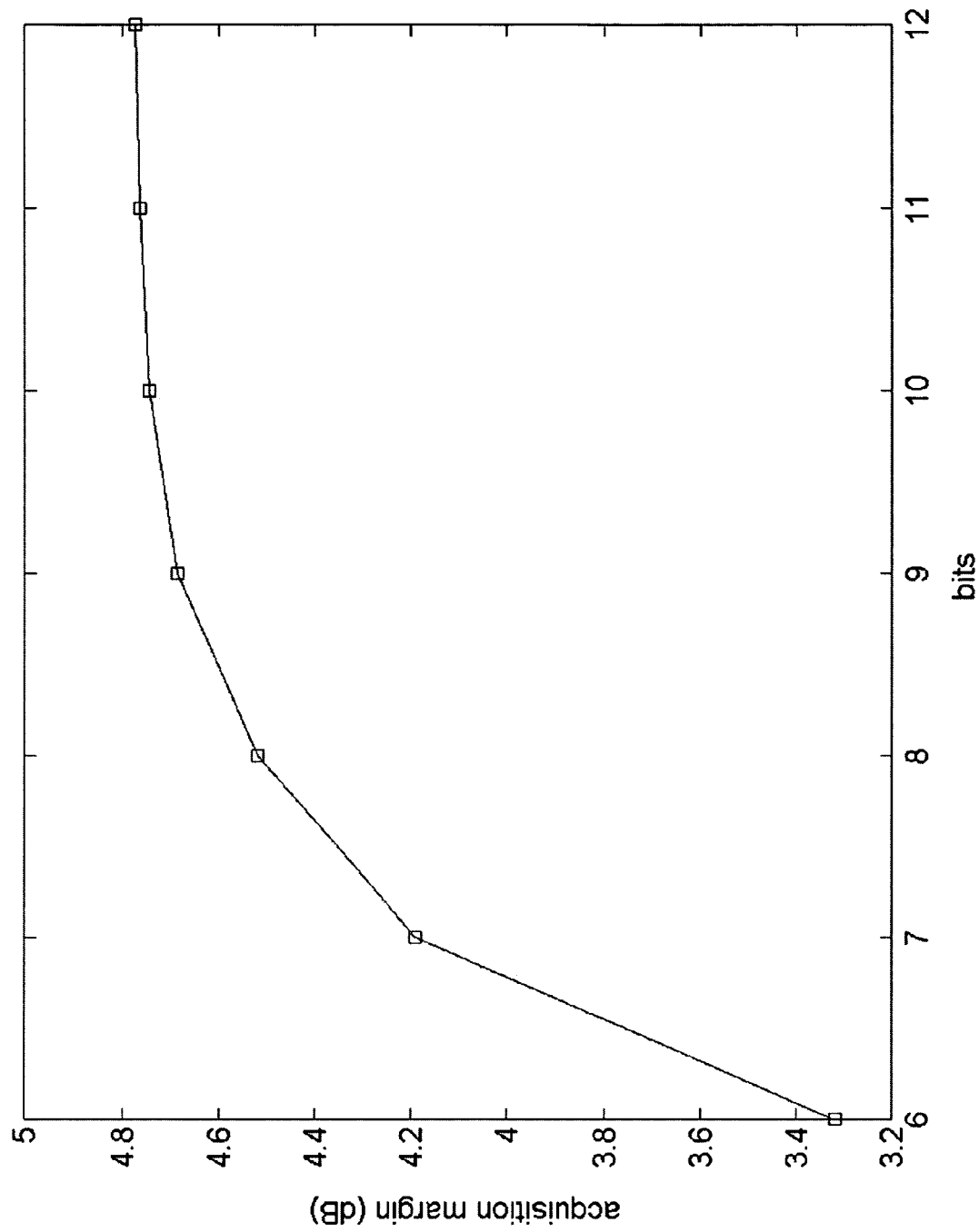
FIG. 8 illustrates a graphical representation of an output of a simulation testing an embodiment of the invention.

For the simulations of certain embodiments of the invention, ADC depth was chosen to be 8-bits in the acquisition module in order to maintain a large dynamic range. It is determined that 10-bits is the preferred bit-depth for the FFT. Simulations of "acquisition-margin" (ratio of largest to next largest correlation) vs. bit-depth show that sensitivity begins to fall off with fewer than 10-bits, while very little is gained by having more. FIG. 8 shows the output of one such simulation, which illustrates the acquisition margin vs. FFT bit dept for 25-29 dB-Hz signals, 10/10 integration, with 2,000 runs averaged.

Figure 9:
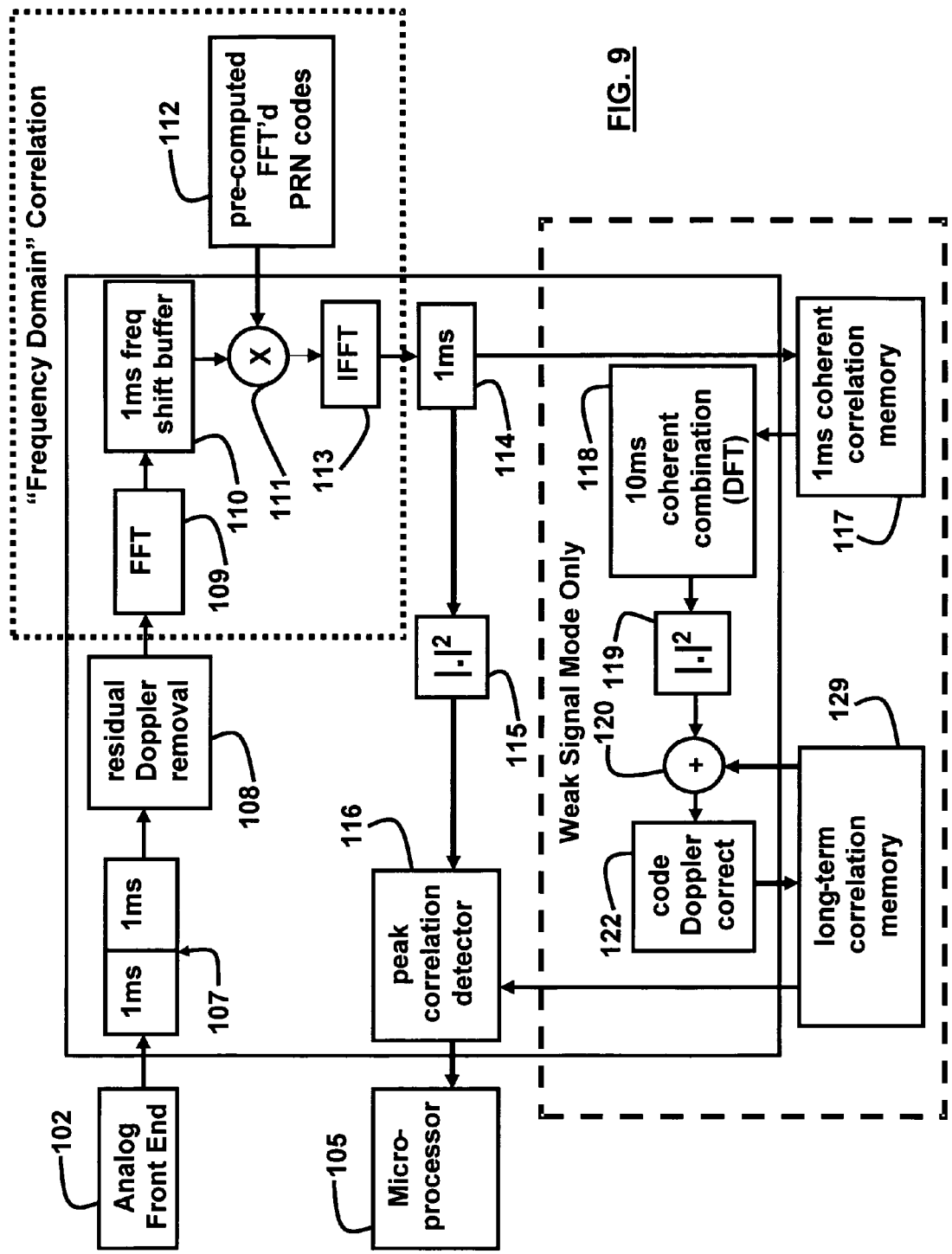
FIG. 9 illustrates a dual mode acquisition block diagram according to an embodiment of the invention.

In yet another embodiment, the acquisition hardware, with reference to FIG. 9, preferably accepts as input: a satellite number, a Doppler range, Doppler search granularity, and coherent and non-coherent integration times. Then, the acquisition hardware 104 (of FIG. 7) preferably calculates the Q-statistic using the following sequence of steps, again with reference to FIG. 9:

1. The acquisition FPGA receives input samples from the ADC. These are streamed into a 2 ms double buffer 107.

2. Samples from the ready buffer 107 enter the Doppler removal block 108 which removes the nominal carrier and residual (coarse) Doppler under test.

3. Next the FFT operation 109 operates on 2048 samples and the output is stored in a 2048-point frequency shift buffer 110.

4. Shifted versions of this output are multiplied 111 against the pre-computed, conjugated Discrete Fourier Transform (DFT) of the desired code 112 and then Inverse Fast Fourier Transformed (IFFT'd) 113 to complete the 1 ms correlation 114. Each one-sample shift corresponds to a 1 kHz offset from the originally removed Doppler.

Strong signal mode acquisition finishes by sweeping across the Doppler range by repeating steps 2-4 and then determining the maximum magnitude (and coordinates) 115 on the 1 ms correlation grid (including the peak correlation detector 116) which it reports back to the microprocessor 105. The weak signal mode finishes in the following way:

5. Each 1 ms vector preferably is stored to the short-term memory 117 by repealing steps 3-4 for each coarse frequency bin in the search range. Programmable rounding is applied to allow 8-bit representation.

6. At the end of 10 ms, during the "off" 10 ms, for each coarse frequency, the 10 corresponding 1 ms correlation vectors 118 are read from the short-term memory 117. The interpolation from the coarse to the fine grid is applied at this point to achieve the desired fine frequency resolution.

7. The squared magnitudes 119 of the correlations 118 are computed 120 and the code Doppler correction 122 is applied before it is accumulated into the long-term memory 129. Rounding here is used to maintain 16-bit words in the long-term memory 129. One of skill in the art will recognize that it is possible to combine short-term memory 117 with long-term memory 129 into a single memory device or a plurality of memory devices without departing from the scope of the present invention.

At the end of the accumulations, the maximum over the long-term grid, Q*, preferably is determined with the peak correlation detector 116 and reported to the microprocessor 105 for threshold comparison.

Some potential bottlenecks limit the performance of the acquisition module 104 (of FIGS. 7 and 10) including: the bandwidth to off-chip static random access memory (SRAM) (for accumulation of the correlation grids) and speed of the FFT operation 109 (of FIG. 9), which is ultimately determined by the size of the FPGA. Running this methodology in real-time requires a relatively large bandwidth to the off chip SRAM (not shown). To provide for this bandwidth, a 64-bit bus (not shown) connects the SRAM to the acquisition FPGA. For example, if the 64-bit bus operates at 66 MHz, this provides a 528 MB/s bandwidth. Weak signal mode requires approximately 32.8 MB/s bandwidth per 1 kHz Doppler search block and thus can cover about 16 kHz at once if limited only by memory bandwidth.

Another potential bottleneck is running the FFTs with sufficient speed. In one embodiment, the hardware has the capability of performing 23 FFTs/ms. Assuming a 250 Hz coarse Doppler spacing, this implies a maximum one pass Doppler coverage of 5.5 kHz. One embodiment of the present invention utilizes 4 parallel butterfly adders (not shown) to implement the FFT, limited by the expected utilization of the flight FPGA. If the usage estimates are proven to be too conservative, the number of butterfly adders could be increased, providing improved FFT speed.

The tracking FPGA preferably comprises a standard block of hardware correlators 103 (of FIG. 7). However, to improve FPGA usage efficiency, rather than processing samples at the sampling rate, data preferably is stored in a first-in-first-out (FIFO) manner and processed by time shared hardware running at a much higher rate than the sampler. The specific implementation preferably includes three time-shared correlator blocks that give 12 channels each, for a total of 36 channels.

Yet another embodiment of the present invention provides a high level of reliability in the severe radiation environment present in high Earth orbits. Specifically, the receiver 100 (with reference to FIG. 7) withstands a total dose radiation level of approximately 100 krad. This exposure is with no box shielding; however, spot shielding is permissible. Moreover, the receiver 100 preferably is tolerant to an approximate 37 MeV-cm$^2$/mg exposure; with no single event upsets (SEUs). Additionally, the receiver 100 preferably is single event latch-up (SEL) and single event burnout (SEB) immune up to approximately 90 MeV-cm$^2$/mg.

Selecting parts that provide the required performance and survivability is a significant design challenge. The following are examples of the various individual components used in forming the embodiments of the invention. While, specific parts are identified, those skilled in the art would readily recognize that comparable parts may be used as a substitute for the parts identified below, and the embodiments of the invention are not limited to a particular type of part/component. One of skill in the art will also recognize that some or all of the hardware components may alternately be implemented in software.

The flight radio frequency (RF) analog front end 102 (of FIGS. 7 and 9) may be built around a PE8510×L1/L2 GPS front end ASIC available from Peregrine Semiconductor Corporation, California, USA. For the FPGAs, a RTAX-2000 available from Actel Corporation, California, USA, may be used. The combinatorial and sequential logic of Actel's device satisfactorily meets the radiation requirements of operation in a space environment. The random access memories (RAMs) on the FPGA offered by Actel are actually not immune from SEUs; however, Actel offers different Error Detection and Correction (EDAC) algorithms in their tool set to increase the data resiliency of SRAM. The flight SRAM is preferably a 4 SRAM die available from BAE Systems North America, Virginia, USA, packaged in a Multi-Chip Module (MCM).

The baseline flight oscillator is preferably an ovenized crystal oscillator (OXO), however a high quality temperature controlled crystal oscillator (TCXO) may be used for applications that desire to trade some power, mass, and cost saving for slightly reduced performance. An RH-CF5208 ColdFire processor available from Motorola, Illinois, USA may be used as the microprocessor 105 (of FIGS. 7 and 9). It is a true embedded processor with very low-power consumption and almost no glue logic.

Figure 10:
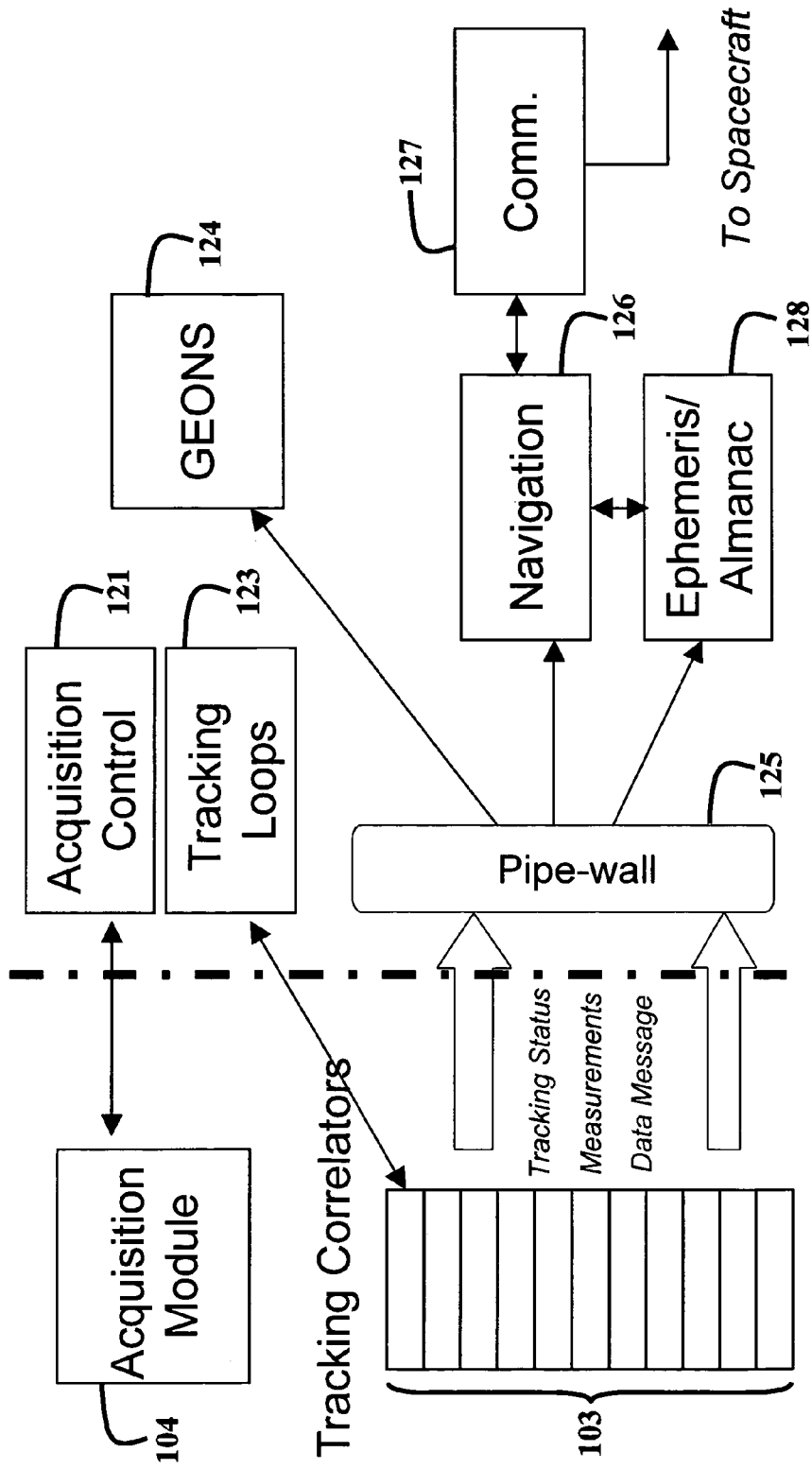
FIG. 10 illustrates a software/hardware interface schematic diagram according to an embodiment of the invention.

A software embodiment of the invention comprises two major components, as illustrated in the block diagram in FIG. 10. The first component of the software is the low-level functions that interface directly with optional hardware components to produce raw code phase, carrier Doppler, and carrier phase measurements. These functions include the control of the acquisition engine 121 as well as the tracking loops 123, which preferably are also specialized for the weak signal environment. These tasks preferably operate at the interrupt level and have direct communication with the hardware.

is the embodiment also preferably includes basic navigation software, which is preferably run on the Nucleus™ real-time operating system available from Accelerated Technology, Inc. This software forms measurements, provides the standard position, velocity, and time point solutions when four or more satellites are being tracked, and handles commanding and telemetry messages. Additionally, this software embodiment of the invention preferably includes an attitude determination capability when setup with a suitable antenna configuration. The GPS Enhanced Onboard Navigation System (GEONS) 124 preferably is integrated with the receiver software to provide onboard orbit determination capabilities, and to provide accurate state estimation/propagation during periods of limited/no GPS observability. The navigation software preferably is hardware independent by utilizing a pipewall construct 125 to communicate with the low-level software functions (navigation 126, communications 127 (to a spacecraft), and the Ephermeris/Almanac 128, which provides GPS data). As a result, the new software can be run with both the hardware and the receiver cards (not shown), which optionally allows the software and hardware embodiments of the invention to function in parallel. Thus, embodiments of the invention software optionally can be used with other types of hardware platforms. One of skill in the art will recognize that some or all of the harware functions depicted in FIG. 10 alternately may be implemented in software.

Yet another embodiment provides a GPS receiver 100 that is a fully space flight qualified GPS receiver 100 optimized for fast signal acquisition and weak signal tracking. The fast acquisition capabilities preferably provide exceptional TTFF with no a priori receiver state or GPS almanac information, even in the presence of high Doppler shifts present in LEO (or near perigee in highly eccentric orbits). The fast acquisition capability also makes it feasible to implement extended correlation intervals and therefore significantly reduce the acquisition threshold of the embodiments of the invention.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the invention have been described in terms of preferred embodiments, those skilled in the art will recognize that the embodiments of the invention can be practiced with modification within the spirit and scope of the appended claims.

What is claimed is:

1. A global positioning system (GPS) receiver comprising:
    a GPS signal acquisition component comprising a frequency domain correlation module,
    wherein said GPS signal acquisition component is adapted to acquire a GPS signal by receiving data from said GPS signal and processing said data to detect said GPS signal within one second for GPS signals with an EIRP of at least −160 dBW, and
    wherein said GPS receiver is adapted to operate in a space environment.

2. The GPS receiver of claim 1, further comprising:
    a plurality of GPS signal tracking correlators adapted to track said GPS signals with an EIRP of at least −175 dBW.

3. The GPS receiver of claim 1, wherein said GPS signal tracking correlators comprise a field-programmable gate array (FPGA).

4. The GPS receiver of claim 1, wherein said GPS signal acquisition component comprises a field-programmable gate array (FPGA).

5. The GPS receiver of claim 1, wherein said GPS signal acquisition component is adapted to acquire a GPS signal within one minute for GPS signals with an EIRP of at least −180 dBW.

6. The GPS receiver of claim 1, wherein said GPS signal acquisition component is adapted to perform a Fast Fourier Transform (FFT) correlation process on said GPS signals.

7. The GPS receiver of claim 1, wherein said GPS signal acquisition component is adapted to acquire a GPS signal without a priori data for GPS signals with an EIRP of at least −180 dBW.

8. A global positioning system (GPS) receiver comprising:
    a GPS signal acquisition component comprising a frequency domain correlation module,
    wherein said GPS signal acquisition component is adapted to acquire said GPS signals with an EIRP of at or below −180 dBW without a priori data, and
    wherein the acquired GPS signal is acquired by receiving data from said GPS signal and processing said data to detect said GPS signal substantially in real time.

9. The GPS receiver of claim 8, further comprising:
    a plurality of GPS signal tracking correlators adapted to track said GPS signals with an EIRP of at least −175 dBW.

10. The GPS receiver of claim 9, wherein said GPS signal tracking correlators comprising a field-programmable gate array (FPGA).

11. The GPS receiver of claim 8, wherein said GPS signal acquisition component comprises a field-programmable gate array (FPGA).

12. The GPS receiver of claim 8, wherein said GPS signal acquisition component is adapted to acquire a GPS signal within one minute for GPS signals with an EIRP of at least −180 dBW.

13. The GPS receiver of claim 8, wherein said GPS signal acquisition component is adapted to acquire a GPS signal within one second for GPS signals with an EIRP of at least −160 dBW.

14. The GPS receiver of claim 8, wherein said GPS signal acquisition component is adapted to acquire a GPS signal within one minute for GPS signals with an EIRP of at least −180 dBW, and to acquire a GPS signal within one second for GPS signals with an EIRP of at least −160 dBW.

15. The GPS receiver of claim 8, wherein said GPS signal acquisition component is adapted to perform a Fast Fourier Transform (FFT) correlation process on said GPS signals.

16. A global positioning system (GPS) receiver comprising:
    a GPS signal acquisition component comprising a frequency domain correlation module,
    wherein said GPS signal acquisition component is adapted to acquire said GPS signals with an EIRP of at or below −160 dBW without a priori data, and
    wherein the acquired GPS signal is acquired by receiving data from said GPS signal and processing said data to detect said GPS signal substantially in real time.

17. The GPS receiver of claim 16, further comprising:
    a plurality of GPS signal tracking correlators adapted to track said GPS signals with an EIRP of at least −175 dBW.

18. The GPS receiver of claim 17, wherein said GPS signal tracking correlators comprising a field-programmable gate array (FPGA).

19. The GPS receiver of claim 16, wherein said GPS signal acquisition component comprises a field-programmable gate array (FPGA).

20. The GPS receiver of claim 16, wherein said GPS signal acquisition component is adapted to acquire a GPS signal within one minute for GPS signals with an EIRP as low as −180 dBW.

21. The GPS receiver of claim 16, wherein said GPS signal acquisition component is adapted to acquire a GPS signal within one second for GPS signals with an EIRP of at least −160 dBW.

22. The GPS receiver of claim 16, wherein said GPS signal acquisition component is adapted to acquire a GPS signal within one minute for GPS signals with an EIRP of at least −180 dBW, and to acquire a GPS signal within one second for GPS signals with an EIRP of at least −160 dBW.

23. The GPS receiver of claim 16, wherein said GPS signal acquisition component is adapted to perform a Fast Fourier Transform (FFT) correlation process on said GPS signals.

24. A method of acquiring global positioning system (GPS) signals, said method comprising the steps:
    receiving GPS signals;
    performing a frequency domain correlation process on said GPS signals;
    comparing the correlated GPS signals with a predetermined threshold and acquiring a GPS signal if a correlated GPS signal exceeds the predetermined threshold;
    wherein said steps of acquiring said GPS signals are performed within one minute for GPS signals as low as −180 dBW.

25. The method of claims 24, wherein said steps of acquiring said (GPS) signals are performed within one second for GPS signals as low as −160 dBW.

26. The method of claim 24, further comprising acquiring said GPS signal without a priori data.

* * * * *